(12) United States Patent
Andréani

(10) Patent No.: US 11,319,898 B2
(45) Date of Patent: May 3, 2022

(54) THRUST REVERSER ASSEMBLY FOR AN ENGINE NACELLE OF AN AIRCRAFT

(71) Applicant: Airbus Operations GmbH, Hamburg (DE)

(72) Inventor: Luc Andréani, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 100 days.

(21) Appl. No.: 16/797,557

(22) Filed: Feb. 21, 2020

(65) Prior Publication Data

US 2020/0277917 A1 Sep. 3, 2020

(30) Foreign Application Priority Data

Feb. 28, 2019 (DE) .......................... 102019105128.2

(51) Int. Cl.
*F02K 1/72* (2006.01)
*B64D 29/06* (2006.01)

(52) U.S. Cl.
CPC ................ *F02K 1/72* (2013.01); *B64D 29/06* (2013.01)

(58) Field of Classification Search
CPC ..... F02K 1/70; F02K 1/72; F02K 1/62; F02K 1/625; F02K 1/763
See application file for complete search history.

(56) References Cited

U.S. PATENT DOCUMENTS

| 3,380,662 A * | 4/1968 | Miller ........................ F02K 1/62 |
| | | 239/265.37 |
| 3,541,794 A | 11/1970 | Johnston et al. |
| 3,764,096 A | 10/1973 | Wright |
| 3,831,376 A * | 8/1974 | Moorehead ............. F02K 1/827 |
| | | 60/226.2 |
| 5,974,783 A | 11/1999 | Gonidec et al. |
| 2013/0205753 A1* | 8/2013 | Todorovic ................ F02K 1/64 |
| | | 60/226.2 |
| 2013/0284822 A1 | 10/2013 | Howarth et al. |
| 2015/0267642 A1* | 9/2015 | Gormley ................ F02K 1/763 |
| | | 239/265.19 |
| 2016/0363097 A1 | 12/2016 | Foutch |

FOREIGN PATENT DOCUMENTS

| DE | 3012027 A1 | 10/1980 |
| DE | 69714565 T2 | 4/2003 |
| EP | 2660454 A2 | 11/2013 |
| FR | 2650861 A1 | 2/1991 |
| GB | 1345337 A | 1/1974 |

OTHER PUBLICATIONS

European Search Report for corresponding European Application No. 20158374 dated Jun. 24, 2020.
German Search Report; priority document.

* cited by examiner

*Primary Examiner* — Andrew H Nguyen
(74) *Attorney, Agent, or Firm* — Greer, Burns & Crain, Ltd.

(57) ABSTRACT

To reduce the number of necessary actuators, improve reliability and redundancy, as well as reducing weight and fuel consumption, a thrust reverser assembly configured for reversing thrust of an aircraft engine is proposed. The thrust reverser assembly comprises flaps and linkage arrangements, wherein the flaps are driven between a stowed position and a deployed position by the linkage arrangement due to an axial movement of a part of the engine nacelle. The linkage arrangement is configured as a four bar linkage, in particular, a double rocker bar linkage.

15 Claims, 10 Drawing Sheets

THRUST REVERSER ASSEMBLY FOR AN ENGINE NACELLE OF AN AIRCRAFT

CROSS-REFERENCES TO RELATED APPLICATIONS

This application claims the benefit of the German patent application No. 102019105128.2 filed on Feb. 28, 2019, the entire disclosures of which are incorporated herein by way of reference.

FIELD OF THE INVENTION

The invention relates to a thrust reverser assembly. Furthermore, the invention relates to an engine nacelle having such a thrust reverser assembly and an aircraft equipped with the thrust reverser assembly or the engine nacelle.

BACKGROUND OF THE INVENTION

U.S. Pat. No. 3,541,794 A discloses a thrust reverser. The thrust reverser has a flap arranged in a bypass duct of the aircraft engine. The flap is pivotally supported by a single link that is also arranged in the bypass duct.

US 2016/0 363 097 A1 discloses thrust reverser which has a reverser flap stored in a nacelle cowl. Telescoping pistons are used to deploy the flap and cause thrust reversal.

SUMMARY OF THE INVENTION

It is an object of the invention to improve thrust reversers, in particular with respect to fuel efficiency and complexity.

The invention provides a thrust reverser assembly configured for reversing thrust of an aircraft engine, the aircraft engine having a bypass duct and being arranged in an engine nacelle, the engine nacelle having a fixed member and a translating member, wherein the thrust reverser assembly comprises a flap and a linkage arrangement, wherein the flap is driven between a stowed position and a deployed position by the linkage arrangement due to an axial movement of the translating member relative to the fixed member, wherein the linkage arrangement is configured to move the flap along a movement path that, when the flap enters the bypass duct, has a radial translational movement component radially inward in an engine nacelle radial direction.

Preferably, the linkage arrangement is configured so that the movement path, when the flap enters the bypass duct, is defined by a composition of the radial translational movement component and a rotational movement component, wherein the rotational movement component causes a tilting of the flap, so as to divert airflow from the bypass duct radially outward.

Preferably, the linkage arrangement is configured so that the movement path, when the flap is in the bypass duct, is defined by a composition of the radial translational movement component, a rotational movement component, wherein the rotational movement component causes a tilting of the flap, so as to divert airflow from the bypass duct radially outward, and an axial translational movement component in an engine nacelle axial direction, so as to move the flap along the bypass duct towards aft.

Preferably, the linkage arrangement is configured so that the movement path has towards its deployed position portion the radial translational component directed radially outward.

Preferably, the linkage arrangement is configured to be entirely outside the bypass duct, when the flap is in the closed position.

Preferably, the linkage arrangement comprises a first link bar pivotally coupled to the flap by a first flap joint. Preferably, the linkage arrangement comprises a second link bar pivotally coupled to the flap by a second flap joint. Preferably, the first and second flap joints are spaced apart along an engine nacelle axial direction, in such a way that the flap follows the movement path.

Preferably, the first link bar is longer than the second link bar, in such a way that the flap follows the movement path.

Preferably, the linkage arrangement comprises a drive link bar pivotally coupled to the flap by a drive flap joint. Preferably, the drive link bar is configured to drive the flap due to an axial movement of the translating member relative to the fixed member.

Preferably, the drive flap joint coincides with the first flap joint or is arranged forward in an engine nacelle axial direction.

Preferably, the drive link bar is longer than each of the first and second link bars.

Preferably, the linkage arrangement is configured as a double rocker bar linkage, so that the flap follows the movement path.

Preferably, the first and second link bars form a double rocker, so that the flap follows the movement path.

The invention provides an engine nacelle configured for accommodating an aircraft engine, the aircraft engine having a bypass duct, wherein the engine nacelle comprises a fixed member, a translating member, and a preferred thrust reverser assembly, wherein the flap is arranged so as to be able to enter the bypass duct, wherein the linkage arrangement is coupled to the fixed member and the translating member, so that the flap is driven between a stowed position and a deployed position by the linkage arrangement due to an axial movement of the translating member relative to the fixed member.

Preferably, the engine nacelle includes an aircraft engine.

Preferably, the first link bar is pivotally coupled to the fixed member by a first member joint. Preferably, the second link bar is pivotally coupled to the fixed member by a second member joint. Preferably, the first and second member joints are spaced apart along an engine nacelle axial direction, in such a way that the flap follows the movement path.

Preferably, the drive link bar is pivotally coupled to the translational member by a drive member joint, so as to drive the flap due to an axial movement of the translating member relative to the fixed member.

Preferably, the fixed member includes a first cantilever protrusion extending axially aft. Preferably, the first member joint is disposed at the cantilever protrusion. Preferably, the second member joint is disposed at the cantilever protrusion.

Preferably, the translational member includes a second cantilever protrusion extending axially forward and the drive member joint is disposed at the cantilever protrusion.

Preferably, one cantilever protrusion accommodates the other cantilever protrusion, when the flap is in the closed position.

Preferably, the linkage arrangement is configured as a four bar double rocker linkage. The four bar double rocker linkage is preferably formed by the first and second link bars, a flap portion, which preferably extends between the first and second flap joints, and a cantilever portion, which preferably extends between the first and second member joints.

Preferably, the first and second link bars form a double rocker, so that the flap follows the movement path.

It is preferred that, in its closed position, the flap is arrangeable/is arranged to form part of a duct wall of the bypass duct.

It is preferred that, in its deployed position, the flap is arrangeable/is arranged to divert an airflow from the bypass duct in order to reverse the thrust.

Preferably the engine nacelle comprises a plurality of thrust reverser arrangements, which are distributed along the circumferential direction adjacent to the bypass duct.

The invention provides an aircraft comprising a preferred thrust reverser assembly and/or a preferred engine nacelle.

Subsequently, advantageous effects and result that the invention may achieve are discussed.

In contrast to known thrust reversers, the instant thrust reverser assembly does not require specialized actuators or control units for controlling the movement of the thrust reverser flaps. Thereby, the weight of thrust reversers may be reduced. In addition, the assembly is reduced in complexity, since simple linkages are sufficient to control the movement path of the flaps in such a way that an initial opening is formed. Subsequently, the flaps are translated and rotated into the deployed position. When the flaps enter the bypass duct, a small shock wave due to rapid change in the airflow may be generated. This small shock may propagate along the bypass channel towards the inlet of the nacelle, resulting in a comparatively strongly fluctuating inlet flow. The strong fluctuations may cause a phenomenon known as "engine surge," which can result in higher loads to the thrust reverser and hence increased maintenance efforts. By using the movement path according to the invention, however, the fluctuations may be discharged via the initial opening thereby reducing the chance of surging and the loads associated with this phenomenon.

In addition to the reduced complexity provided by a linkage arrangement, the linkage arrangement can be adapted to the reduced load requirements, so that the overall weight of the thrust reverser assembly may be reduced. Furthermore, redundancy can be achieved using a plurality of links or dual load path design, without the need for further hydraulic components. Basically, it is possible to deploy the instant thrust reverser with only one actuator and to still obtain the full thrust reverser capability.

Overall, the preferred thrust reverser assembly can be constructed with shorter axial length requirements of the nacelle due to the movement path controlled by the linkage assembly. Thus, also smaller engine nacelles can be equipped with the system described herein.

Finally, since the thrust reverser is configured to be completely outside the bypass channel of the aircraft engine in the closed position, fuel consumption is further decreased.

Consequently, the comparatively simple linkage solution for the thrust reverser assembly includes, in particular, the following advantages:

Light weight construction
Simple assembly
Reduced number of actuators
Reduced system complexity
Reduced loads
High translational capability in deployed configuration of the mechanisms
Reduced fuel burn, because no drag links are in the bypass engine flow
Redundancy is achieved by the number of links or by dual load path design of the links The simple linkage solution comprises thrust-reverser-unit-panels (TRU-panels) or flaps, which are preferably located radially around, i.e., circumferential, around the moving aft cowl of the engine. In retracted (stowed) position, the panels or flaps are stowed mainly in the moving aft cowl. The TRU-panels are attached to the fixed engine cowl by simple links (a front-link and a rear-link). A strut acts as a relative driving link for the TRU-panels during deployment. It can be a big benefit that behind the impeller (fan disc) and guide wheels no drag-links are necessary, which may significantly reduce the fuel consumption during the (complete) cruise flight.

The drive link is preferably attached to the moving aft cowl frame by a cantilever element or portion. The front-link and rear-link are preferably attached to the fixed cowl by a cantilever element or portion. In one beneficial embodiment, the drive link and the front link may use the same axis for connecting to the TRU-panel (double-joint-element), whereby loads may be reduced and allows for the use of only tension and compression struts.

BRIEF DESCRIPTION OF THE DRAWINGS

Further advantageous effects and functions will be apparent from the detailed description, which makes reference to the schematic drawings listed below.

DETAILED DESCRIPTION OF THE PREFERRED EMBODIMENTS

Figure 1:
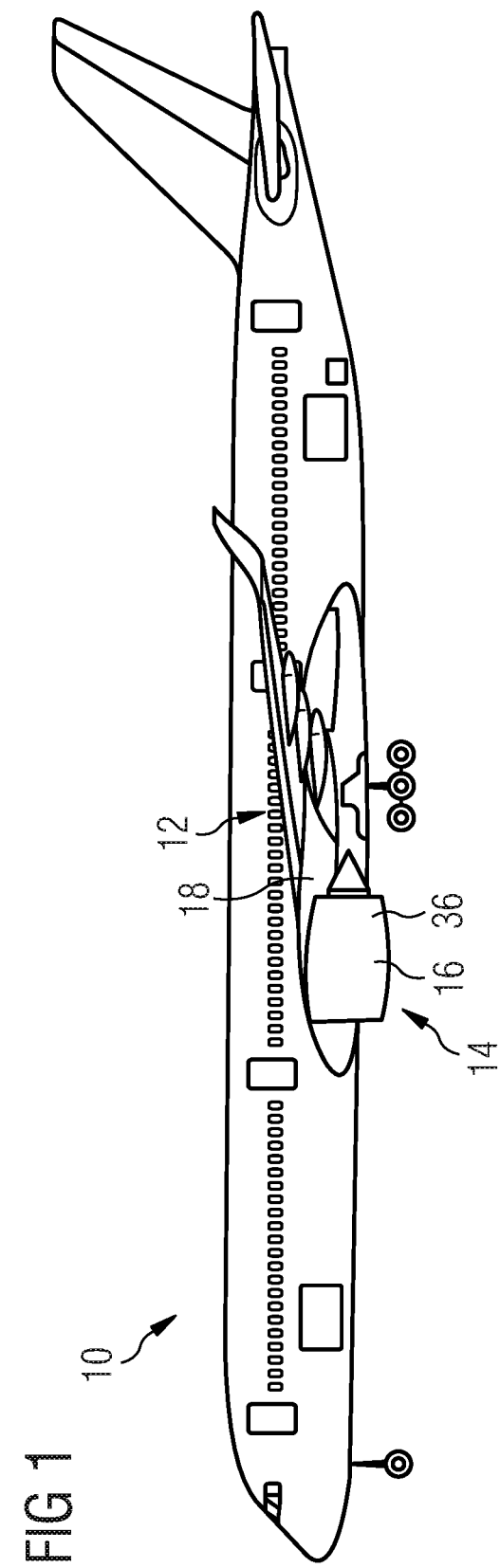
FIG. 1 depicts an aircraft having a preferred thrust reverser assembly.

Reference is made to FIG. 1, which depicts an embodiment of an aircraft 10. The aircraft 10 includes a wing 12 for generating lift and an aircraft engine 14 for generating thrust. An engine nacelle 16 is attached to the wing 12 by a pylon 18. The engine nacelle 16 houses the aircraft engine 14. The aircraft engine 14 is of the bypass type, e.g., an ultra-high bypass ratio engine (UHBR-engine).

Figure 2:
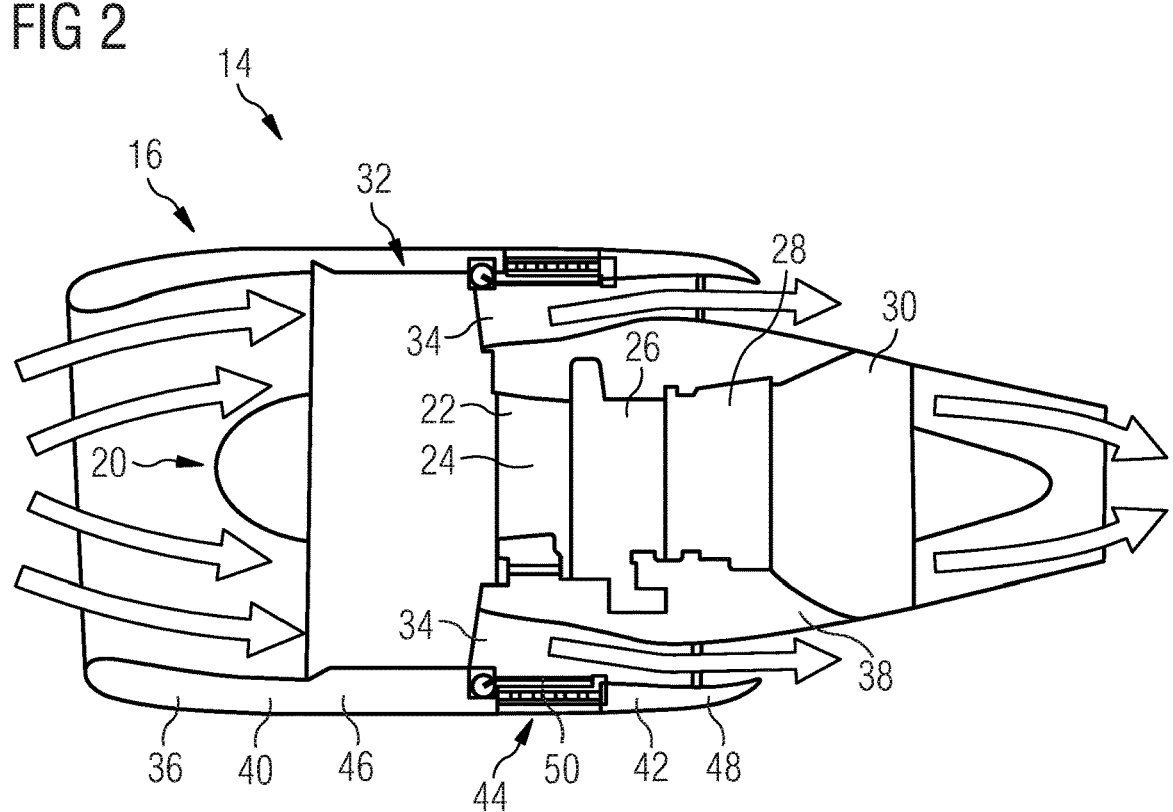
FIG. 2 depicts a cross-section of an engine nacelle with stowed thrust reverser assembly.
Figure 3:
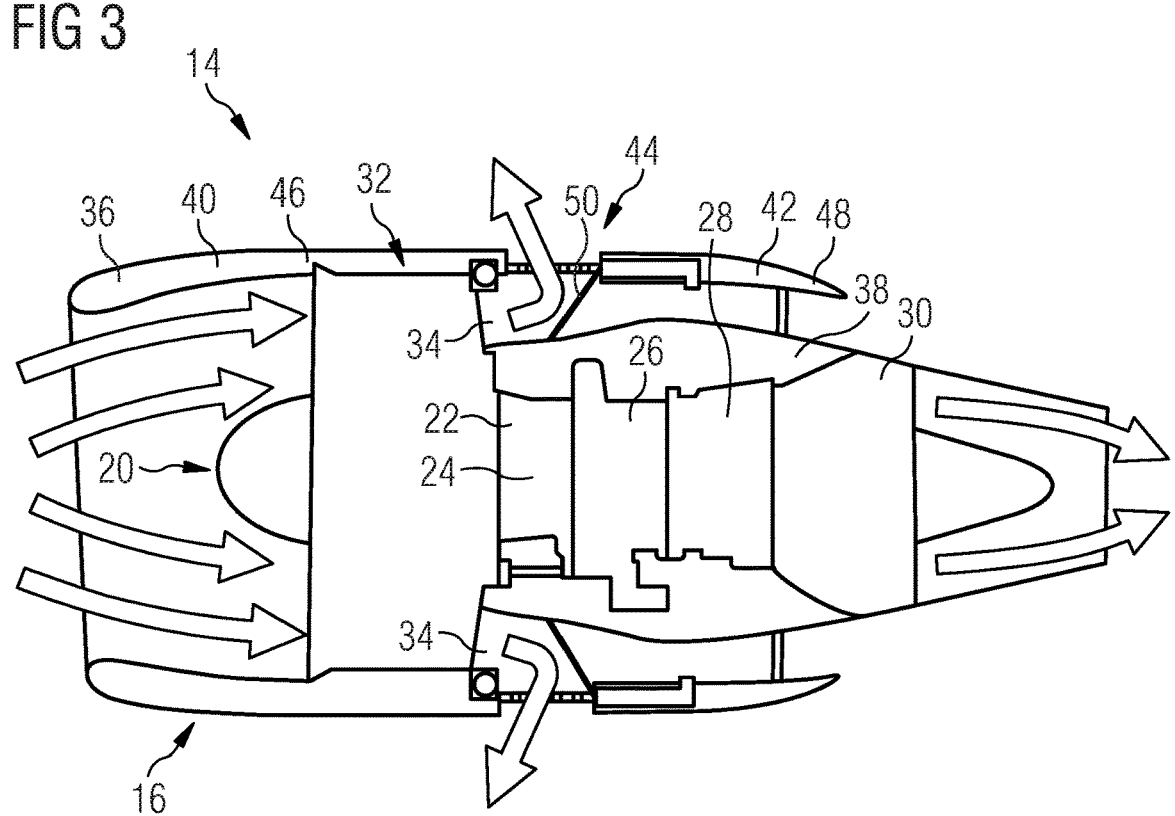
FIG. 3 depicts a cross-section of an engine nacelle with deployed thrust reverser assembly.

Referring to FIG. 2 and FIG. 3, the aircraft engine 14 includes a primary air duct 20. The primary air duct 20 accommodates—in that order along the airflow—a low and high pressure compressor 22, 24, a combustion chamber 26, and a high and low pressure turbine 28, 30. A fan 32 (also known as an impeller) is driven by the low pressure turbine 30.

The engine nacelle 16 has a bypass duct 34. The bypass duct 34 is generally defined by the fan 32 in the axial direction of the engine nacelle 16. The bypass duct 34 is further defined by an engine nacelle cowl 36 and an aircraft engine cowl 38 in the radial direction of the engine nacelle 16. Thus, the bypass duct 34 surrounds the aircraft engine cowl 38 in a circumferential direction of the engine nacelle 16.

The engine nacelle cowl 36 may include a fixed cowl 40, sometimes also called forward cowl. The engine nacelle cowl 36 may also include a movable cowl 42, sometimes called aft cowl or rear cone. The movable cowl 42 can be moved along the axial direction of the engine nacelle 16 relative to the fixed cowl 40.

The aircraft 10 includes a thrust reverser assembly 44. The thrust reverser assembly 44 is preferably included in the engine nacelle 16. The thrust reverser assembly 44 includes a fixed member 46, which may be formed by the fixed cowl 40 or parts thereof, and a translating member 48, which may be formed by the movable cowl 42 or parts thereof.

The thrust reverser assembly 44 comprises one or more flaps 50, which may be deployed due to the relative movement of the translating member 48 with respect to the fixed member 46.

Figure 4:
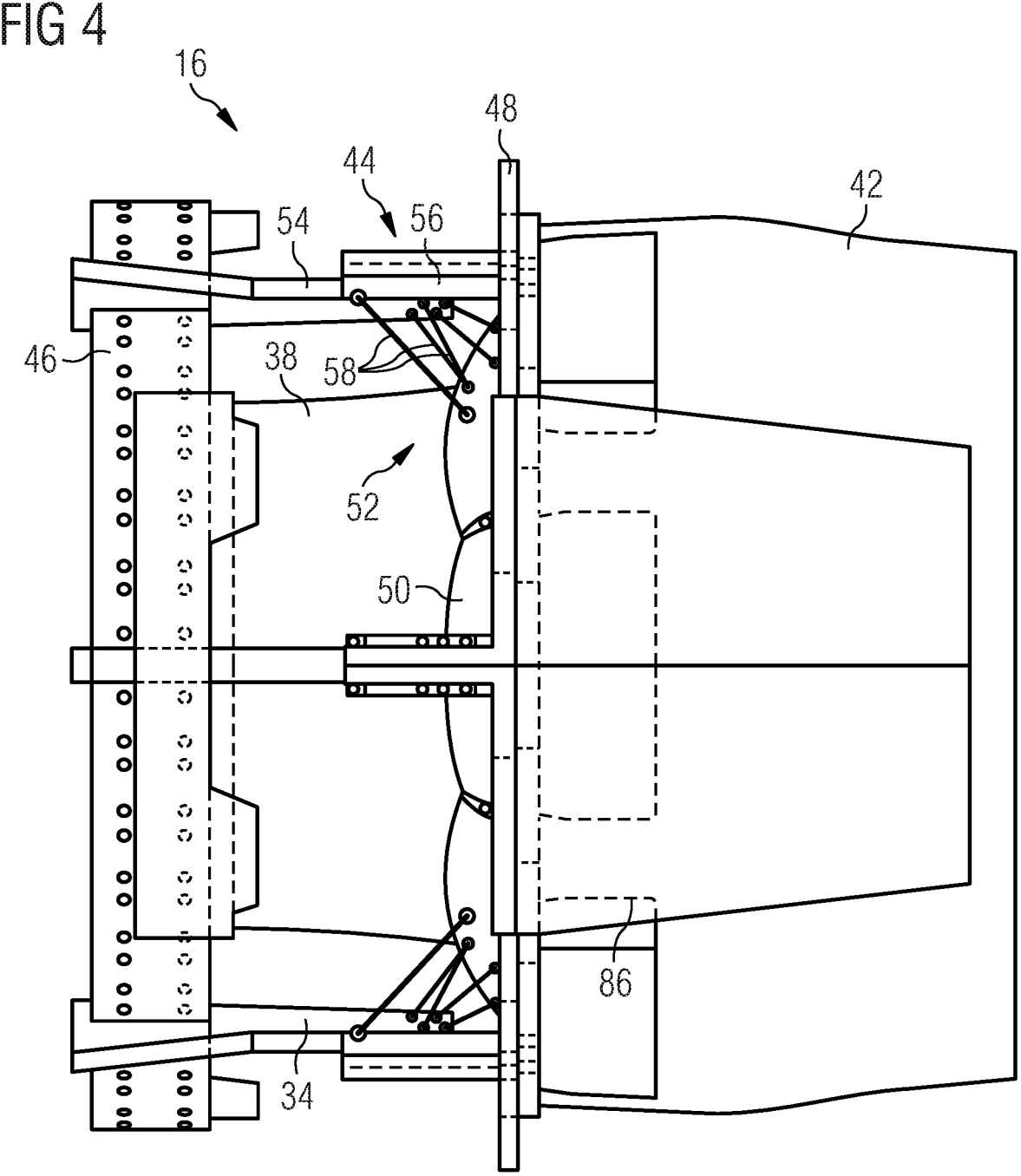
FIG. 4 depicts a top view of an engine nacelle without cowling.
Figure 5:
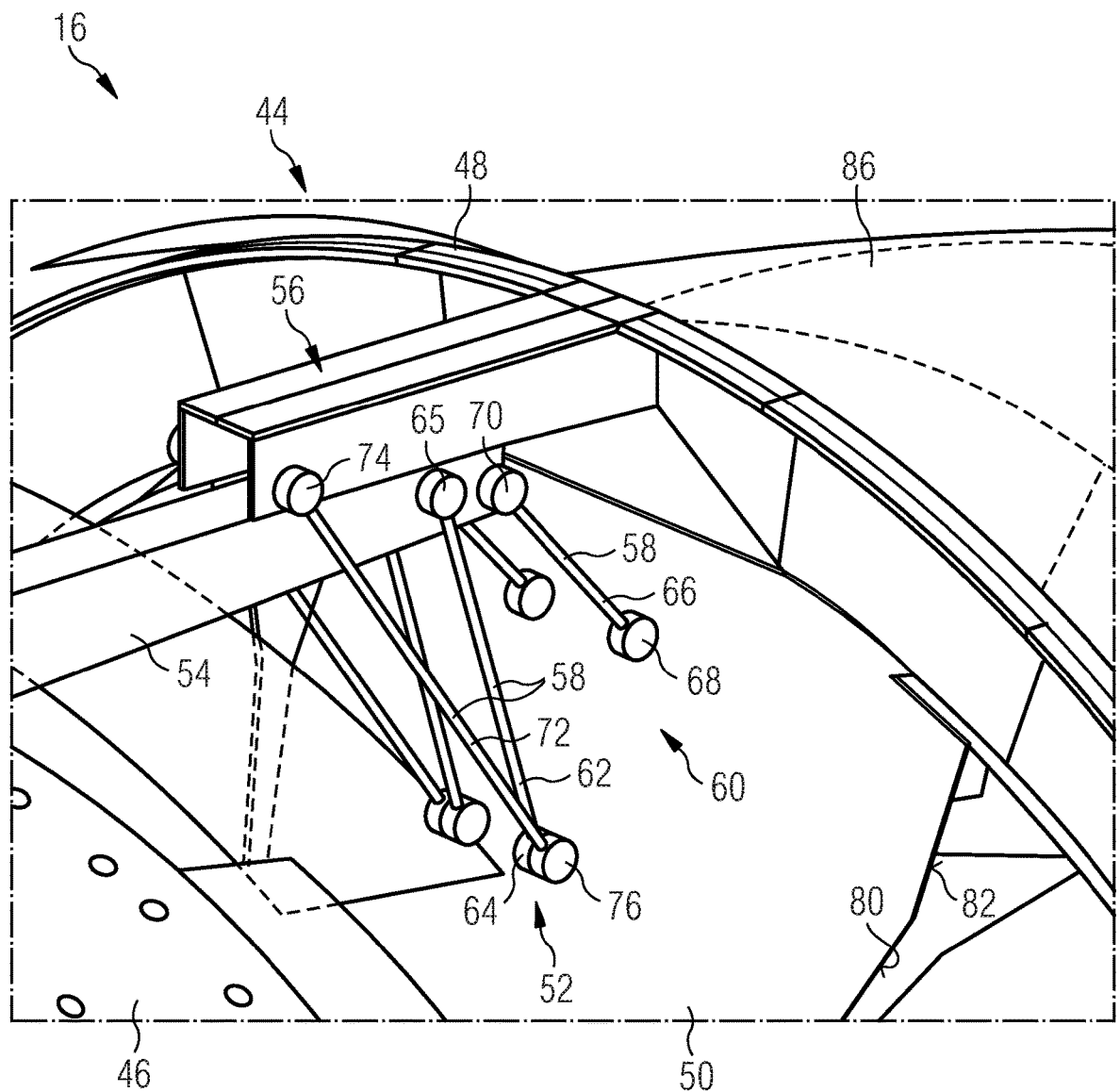
FIG. 5 depicts a detailed view of a linkage arrangement.
Figure 6:
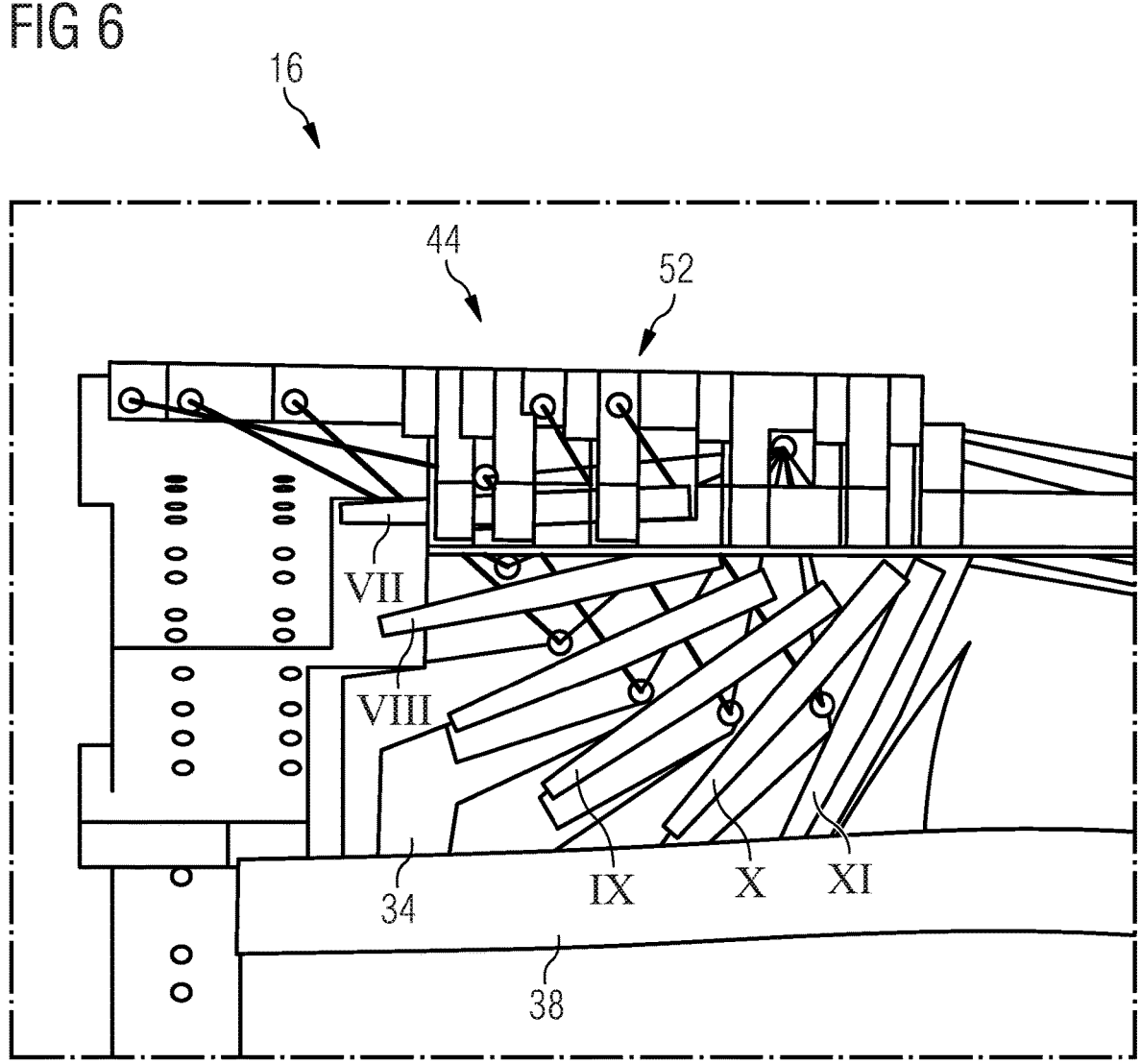
FIG. 6 depicts a sequence of flap positions during deployment.

Referring now to FIG. 4 and FIG. 5, the thrust reverser assembly 44 includes a linkage arrangement 52. The linkage arrangement 52 is mechanically coupled to the fixed member 46, the translating member 48, and the flap 50 so as to move the flap 50 between a stowed position and a deployed position due to the relative movement of the translating member 48 with respect to the fixed member 46.

It should be noted that while in practice usually more than one flap 50 and linkage arrangement 52 will be used, for sake of brevity, the description refers to only one of these as an example, wherever possible.

The fixed member 46 includes a first cantilever protrusion 54. The first cantilever protrusion 54 preferably extends aft in the axial direction of the engine nacelle 16. The translating member 48 includes a second cantilever protrusion 56, which may extend forward in the axial direction. The cantilever protrusions 54, 56 are preferably configured such that they may accommodate each other in the stowed position of the flap 50.

The linkage arrangement 52 comprises several link bars 58 and is configured as a double rocker bar linkage 60. In particular, the linkage arrangement 52 includes a first link bar 62, also designated long link bar or forward link bar. The first link bar 62 is coupled to the flap 50 via a first flap joint 64 and to the fixed member 46, in particular to the first cantilever protrusion 54, via a first member joint 65.

Furthermore, the linkage arrangement 52 includes a second link bar 66. The second link bar 66 is disposed aft of the first link bar 62 in the axial direction. The second link bar 66 is shorter in length than the first link bar 62. The second link bar 66 is also designated short link bar or aft link bar. The second link bar 66 is coupled to the flap 50 via a second flap joint 68 and to the fixed member 46, in particular to the first cantilever protrusion 54, via a second member joint 70. Preferably, the entire second link bar 66 is arranged aft of the first link bar 62, at least in the deployed position.

The linkage arrangement 52 also includes a drive link bar 72. The drive link bar 72 is disposed forward of the first and second link bars 62, 66. The drive link bar 72 is longer than each of the first and second link bars 62, 66. The drive link bar 72 is coupled to the translating member 48, in particular the second cantilever protrusion 56 at its forward end, via a drive member joint 74. Furthermore, the drive link 72 is coupled to the flap 50 via a drive flap joint 76. Preferably, the drive flap joint 76 and the first flap joint 64 coincide in their respective axes or are bolted together as a single joint.

Reference is now made to FIGS. 6 to 11, which depict the subsequent positions of the flap 50, when the thrust reverser assembly 44 transitions from the stowed position VII to the deployed position XI, via intermediate positions VIII to X.

The flap 50 comprises along its circumference a forward edge 78, a lateral angled edge 80, a lateral parallel edge 82, and a rear edge 84. The forward edge 78 is curved an follows the circumferential direction of the engine nacelle 16. The lateral angled edge 80 is straight and extends from the forward edge 78 towards aft and forms an angle with the axial direction of the engine nacelle 16. The parallel edge 82 continues from the lateral angled edge 80 and is substantially parallel to the axial direction. The rear edge 84 also extends along the circumferential direction of the engine nacelle 16. The flap 50 is configured symmetrical with respect to an axis parallel to the axial direction.

Figure 7:
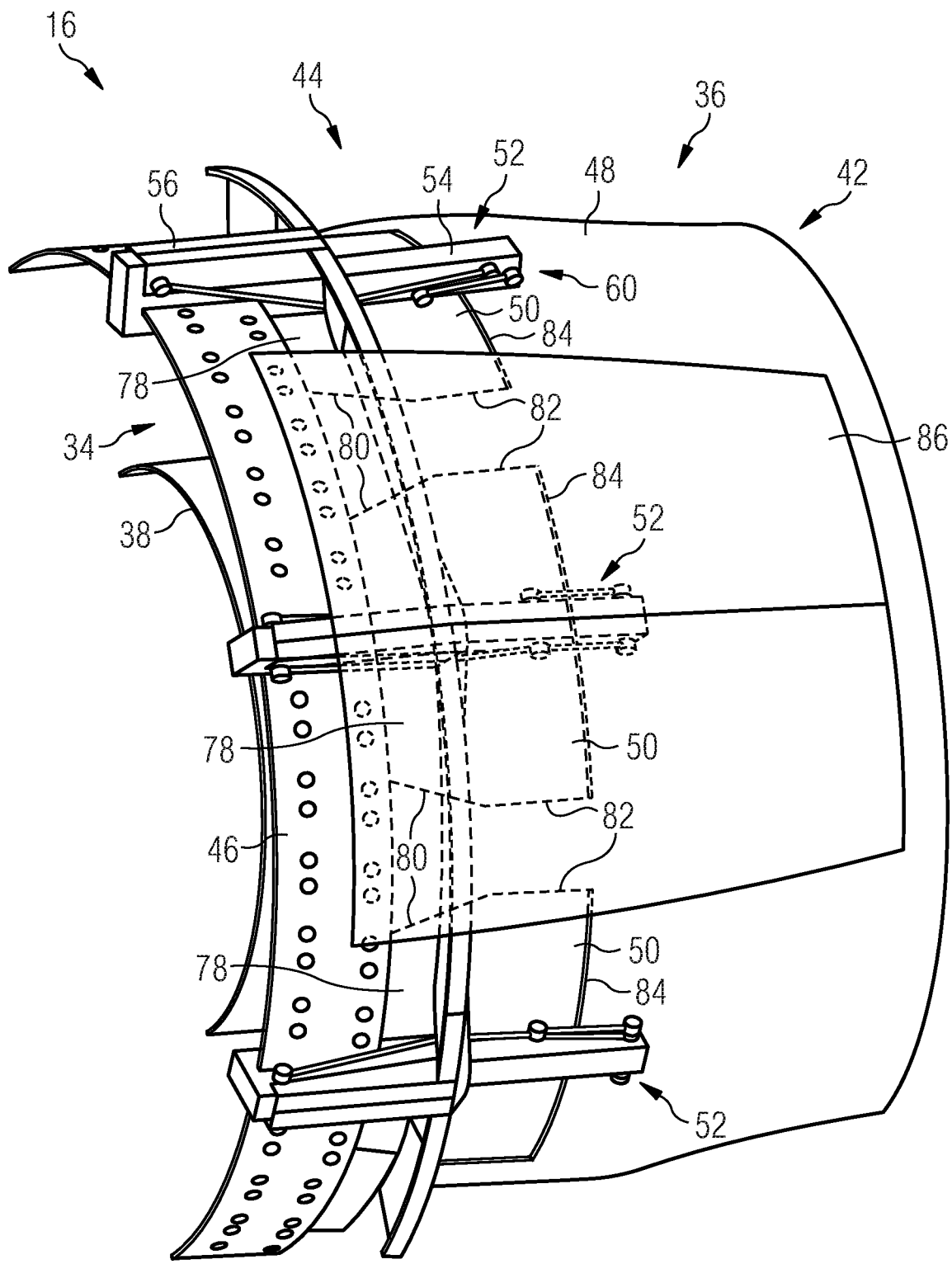
FIG. 7 depicts a perspective view of the thrust reverser assembly in the stowed position.

FIG. 7 depicts the thrust reverser assembly 44 in the stowed position. In the stowed position, the flaps 50 are substantially parallel to the axial direction of the engine nacelle 16, and the forward edge 78 engages the fixed member 46, whereas the lateral parallel edge 82 and the rear edge 84 engage the translation member 48, respectively. The lateral angled edge 80 engages both the fixed member 46 and the translation member 48. In this position, the flap 50 forms part of the duct wall of the bypass duct 34. Also, the linkage arrangement 52 is arranged entirely outside the bypass duct 34. The linkage arrangement 52 is disposed entirely between the flap 50 and the outside cowl 86 of the engine nacelle cowl 36 in the radial direction of the engine nacelle 16.

Figure 8:
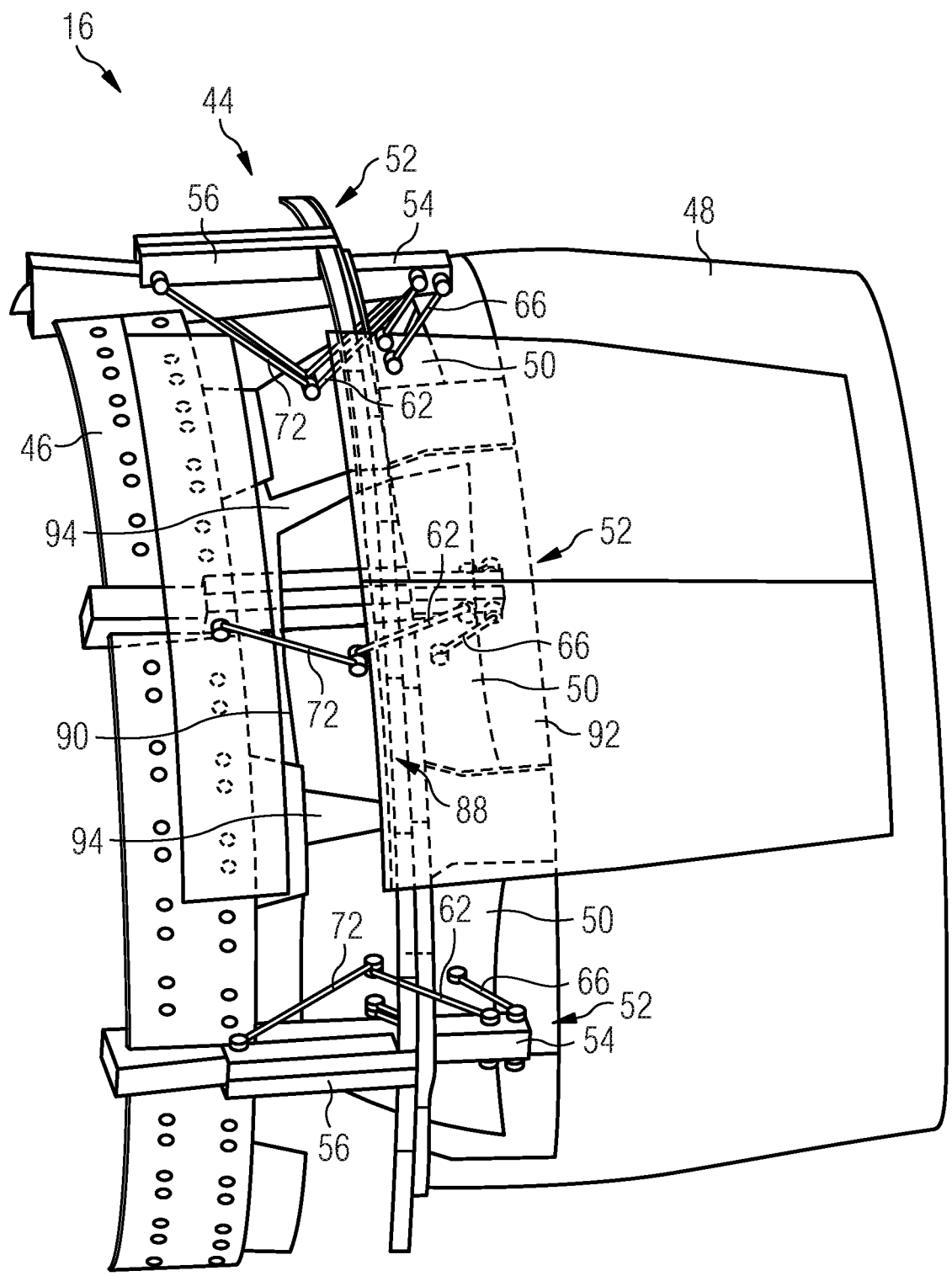
FIG. 8 depicts a perspective view of the thrust reverser assembly in a first position.

FIG. 8 depicts the thrust reverser assembly 44 in intermediate position VIII. Initially, the flap 50 is moved in a translational manner towards aft and radially inward due to the configuration of the linkage arrangement 52. Furthermore, the flap 50 tilts slightly forward. With this configuration an opening 88 is formed, which allows communication of the bypass duct 34 with the environment around the engine nacelle 16. The flap 50 barely dives into the bypass duct 34, so that only minimal diversion of airflow from the bypass duct 34 radially outwards is caused. In this position the outside cowl 86 exposes a front part 90 of the opening 88 and covers a rear part 92 of the initial opening 88. Furthermore, the lateral edges 80, 82 form an hour-glass shaped gap 94 between neighboring flaps 50 in this position.

Figure 9:
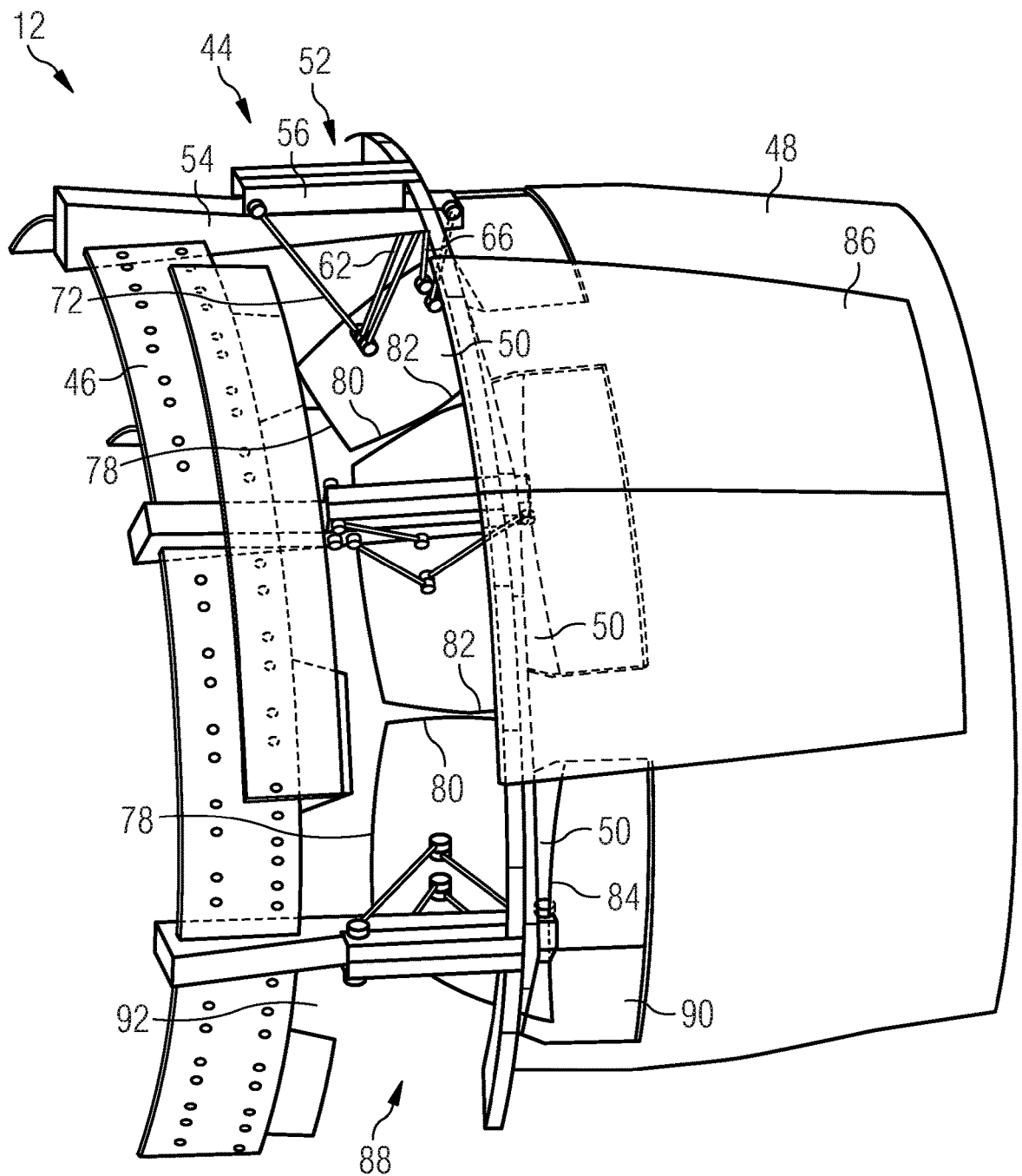
FIG. 9 depicts a perspective view of the thrust reverser assembly in a second position.

FIG. 9 depicts the thrust reverser assembly 44 in intermediate position IX. The flaps 50, controlled by the linkage arrangement 52, are tilted further forward and the translational movement radially inward stops. The translational movement towards aft still continues albeit slower than before. The flaps 50 engage or almost engage each other where the lateral angled edge 80 and the lateral parallel edge 82 meet.

Figure 10:
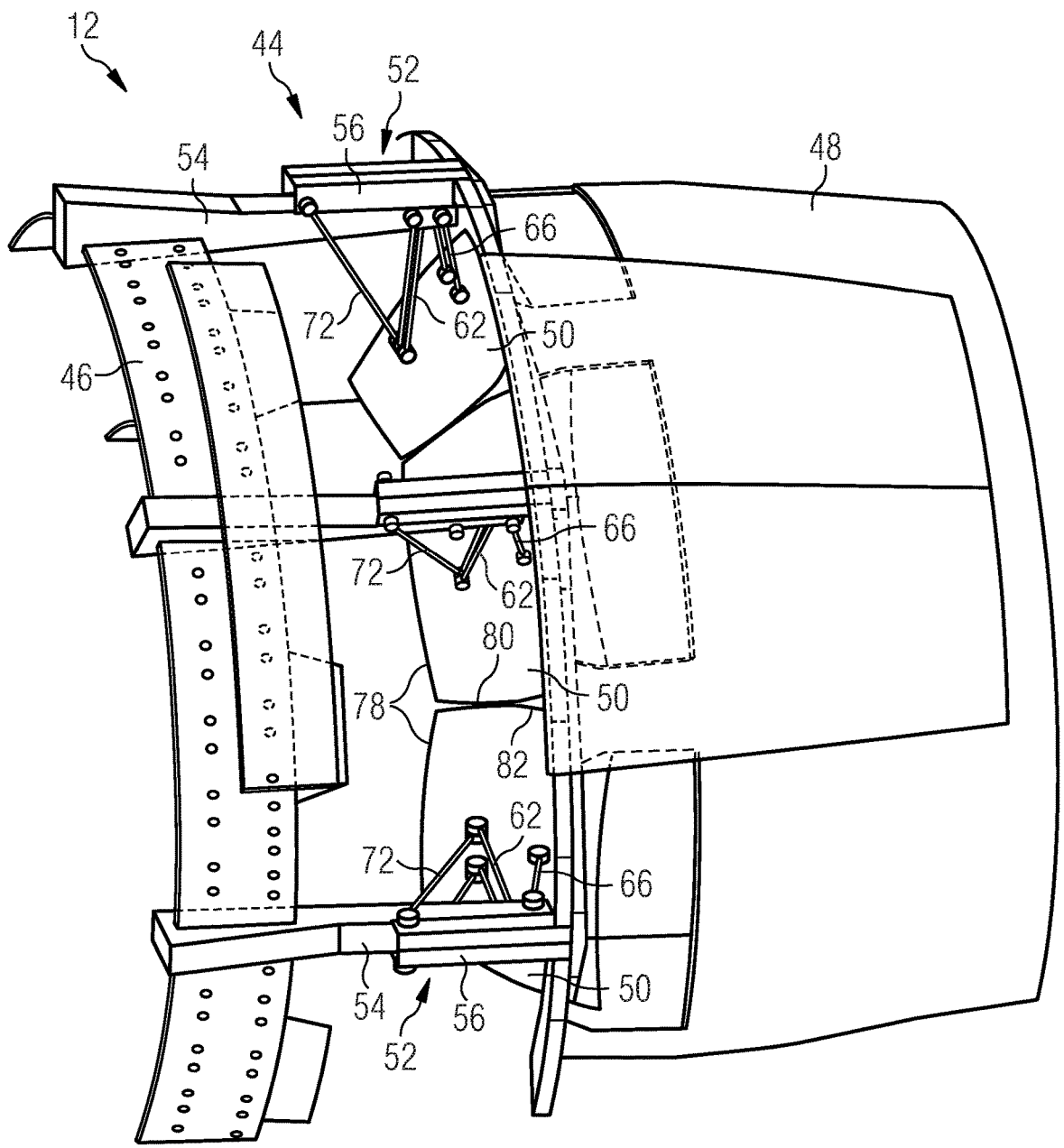
FIG. 10 depicts a perspective view of the thrust reverser assembly in a third position.

FIG. 10 depicts the thrust reverser assembly 44 in intermediate position X. The flaps 50 are tilted further forward and the lateral angled edges 80 of neighboring flaps 50 are parallel to each other. The lateral parallel edges 82 of neighboring flaps 50 define a substantially V-shaped opening. Up to now, the entire movement of the flaps 50 was inward in the radial direction.

Figure 11:
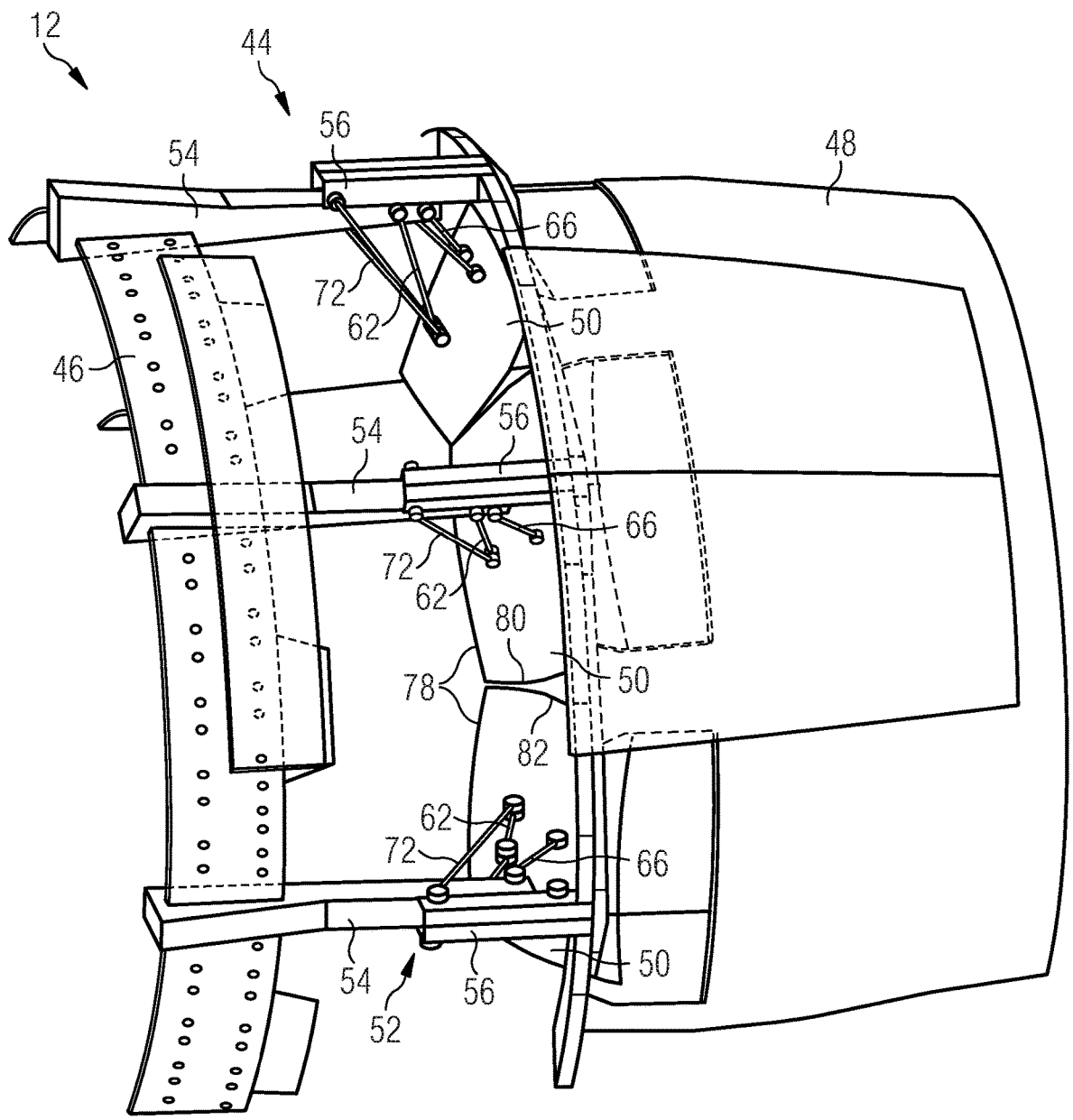
FIG. 11 depicts a perspective view of the thrust reverser assembly in the deployed position.

FIG. 11 depicts the thrust reverser assembly 44 in the deployed position XI. In order to reach this position, the flaps 50 are controlled by the linkage arrangement 52 to make a translational movement radially outward while further tilting the flaps 50 forward until they reach their steepest angle. In this configuration, the forward edge 78 is closest to the aircraft engine cowl 38 or engages the aircraft engine cowl 38. The lateral angled edges 78 of neighboring flaps 50 form a V-shaped opening having a smaller V-angle than the V-shaped opening formed by the lateral parallel edges 80.

While the front part 90 increases in size, the rear part 92 is covered during the whole deployment procedure.

With the described configuration of the thrust reverser assembly 44, it is possible to reduce the number of necessary actuators, improve reliability and redundancy as well as reducing weight and fuel consumption. In addition, a phenomenon known as engine surge may be avoided due to the movement path being defined by a linkage arrangement.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 wing
14 aircraft engine
16 engine nacelle
18 pylon
20 primary air duct
22 low pressure compressor
24 high pressure compressor
26 combustion chamber
28 high pressure turbine
30 low pressure turbine
32 fan
34 bypass duct
36 engine nacelle cowl
38 aircraft engine cowl
40 fixed cowl
42 movable cowl
44 thrust reverser assembly
46 fixed member
48 translating member
50 flap
52 linkage arrangement
54 first cantilever protrusion
56 second cantilever protrusion
58 link bar
60 double rocker bar linkage
62 first link bar
64 first flap joint
65 first member joint
66 second link bar
68 second flap joint
70 second member joint
72 drive link bar
74 drive member joint
76 drive flap joint
78 forward edge
80 lateral angled edge
82 lateral parallel edge
84 rear edge
86 outside cowl
88 opening
90 front part
92 rear part
94 gap
VII stowed position
VIII intermediate position
IX intermediate position
X intermediate position
XI deployed position

The invention claimed is:

1. A thrust reverser assembly configured for reversing thrust of an aircraft engine, the aircraft engine having a bypass duct and being arranged in an engine nacelle, the engine nacelle having a fixed member and a translating member, wherein the thrust reverser assembly comprises:
a flap having a forward edge and a rear edge, and
a linkage arrangement, wherein the flap is driven between a stowed position and a deployed position by the linkage arrangement due to an axial movement of the translating member relative to the fixed member,
wherein the linkage arrangement is configured to move the flap along a movement path that, when the flap enters the bypass duct, both the forward edge and the rear edge have a radial translational movement component radially inward in an engine nacelle radial direction,
wherein the forward edge is forward of the rear edge in the stowed position and the deployed position, and
wherein the linkage arrangement is configured so that the movement path of the rear edge has, towards the deployed position, a portion of the radial translational component directed radially outward.

2. The thrust reverser assembly according to claim 1, wherein the linkage arrangement is configured so that the movement path, when the flap enters the bypass duct, is defined by a composition of the radial translational movement component and a rotational movement component, wherein the rotational movement component causes a tilting of the flap, so as to divert airflow from the bypass duct radially outward.

3. The thrust reverser assembly according to claim 1,
wherein the linkage arrangement is configured so that the movement path, when the flap is in the bypass duct, is defined by a composition of the radial translational movement component and a rotational movement component,
wherein the rotational movement component causes a tilting of the flap, so as to divert airflow from the bypass duct radially outward, and an axial translational movement component in an engine nacelle axial direction, so as to move the flap along the bypass duct towards aft.

4. The thrust reverser assembly according to claim 1, wherein the linkage arrangement is configured to be entirely outside the bypass duct, when the flap is in the stowed position.

5. The thrust reverser assembly according to claim 1, wherein the linkage arrangement comprises a first link bar pivotally coupled to the flap by a first flap joint and a second link bar pivotally coupled to the flap by a second flap joint, and the first link bar is arranged more forward in an engine nacelle axial direction than the second link bar.

6. The thrust reverser assembly according to claim 5, wherein the first and second flap joints are spaced apart along the engine nacelle axial direction and the first link bar is longer than the second link bar, such that the flap follows the movement path.

7. The thrust reverser assembly according to claim 1, wherein the linkage arrangement comprises a drive link bar pivotally coupled to the flap by a drive flap joint and the drive link bar is configured to drive the flap due to the axial movement of the translating member relative to the fixed member.

8. The thrust reverser assembly according to claim 1, wherein the linkage arrangement is configured as a double rocker bar linkage, so that the flap follows the movement path.

9. An engine nacelle configured for accommodating an aircraft engine, the aircraft engine having a bypass duct, wherein the engine nacelle comprises a fixed member, a translating member, and a thrust reverser assembly according to claim 1, wherein the flap is configured to be able to enter the bypass duct, wherein the linkage arrangement is coupled to the fixed member and the translating member, so that the flap is driven between the stowed position and the deployed position by the linkage arrangement due to the axial movement of the translating member relative to the fixed member.

10. The engine nacelle according to claim 9, wherein a first link bar is pivotally coupled to the fixed member by a first member joint and a second link bar is pivotally coupled to the fixed member by a second member joint, wherein the first and second member joints are spaced apart along an engine nacelle axial direction, such that the flap follows the movement path.

11. The engine nacelle according to claim 9, wherein a drive link bar is pivotally coupled to the translational member by a drive member joint, to drive the flap due to the axial movement of the translating member relative to the fixed member.

12. The engine nacelle according to claim 9, wherein, when the flap is in the stowed position, the flap forms part of a duct wall of the bypass duct and the linkage arrangement is disposed entirely outside the bypass duct, and, when the flap is in the deployed position, the flap is configured to divert an airflow from the bypass duct to reverse the thrust.

13. The engine nacelle according to claim 9, wherein the thrust reverser assembly is one of a plurality of thrust reverser arrangements distributed along a circumferential direction of the engine nacelle.

14. An aircraft comprising an engine nacelle according to claim 9.

15. An aircraft comprising a thrust reverser assembly according to claim 1.

* * * * *